(12) United States Patent
Takizawa et al.

(10) Patent No.: US 7,055,655 B2
(45) Date of Patent: Jun. 6, 2006

(54) DISC BRAKE CALIPER ASSEMBLY WITH SHIMS

(75) Inventors: Shinichi Takizawa, Osaka (JP); Yuzuru Uchiyama, Osaka (JP)

(73) Assignee: Shimano Inc., Osaka (JP)

( * ) Notice: Subject to any disclaimer, the term of this patent is extended or adjusted under 35 U.S.C. 154(b) by 211 days.

(21) Appl. No.: 09/984,009

(22) Filed: Oct. 26, 2001

(65) Prior Publication Data

US 2003/0079946 A1    May 1, 2003

(51) Int. Cl.
  *B62L 1/06*    (2006.01)

(52) U.S. Cl. ............... 188/24.19; 188/201; 188/18 A; 384/626; 403/365

(58) Field of Classification Search ............ 188/24.19, 188/201, 26, 18 A; 384/626; 403/365
See application file for complete search history.

(56) References Cited

U.S. PATENT DOCUMENTS

| | | | | |
|---|---|---|---|---|
| 1,949,114 A | * | 2/1934 | Darrach | 384/626 |
| 3,765,511 A | * | 10/1973 | Toyomasu | 188/26 |
| 4,232,068 A | * | 11/1980 | Hoh et al. | 428/43 |
| 4,803,433 A | * | 2/1989 | McBride | 324/318 |
| 5,316,061 A | * | 5/1994 | Lee | 144/218 |
| D423,909 S | * | 5/2000 | Hartin | D8/349 |

FOREIGN PATENT DOCUMENTS

JP    2001-323922 A  * 11/2001

OTHER PUBLICATIONS

Shimano, Shimano DEORE XT Disc Brake System, Service instructions SI-8180D, Mar., 2000.*
McMaster-Carr Supply Co., Catalog 102, p. 2843.*
Installation Instructions for Shimano Calipers (BR-M755), Prior to Oct. 2001, 1 page.

* cited by examiner

*Primary Examiner*—James McClellan
*Assistant Examiner*—Mariano Sy
(74) *Attorney, Agent, or Firm*—Global IP Counselors, LLP

(57) ABSTRACT

A bicycle assembly includes a frame portion, a component and a shim. The frame portion has a component mounting section. The component has a frame mounting section. The frame mounting section is removably coupled to the component mounting section by a fastener. The shim is mounted between the component mounting section and the frame mounting section on the fastener to space the component a predetermined distance from the frame portion. The shim includes a shim portion and a handle portion. The shim portion includes two shim sections connected together. The shim sections have free ends spaced from each other to form an open ended fastener opening with the fastener selectively received therein. The shim portion has a predetermined thickness in an axial direction of the fastener opening to space the component a predetermined distance from the frame section. The handle portion extends outwardly from the shim portion.

15 Claims, 7 Drawing Sheets

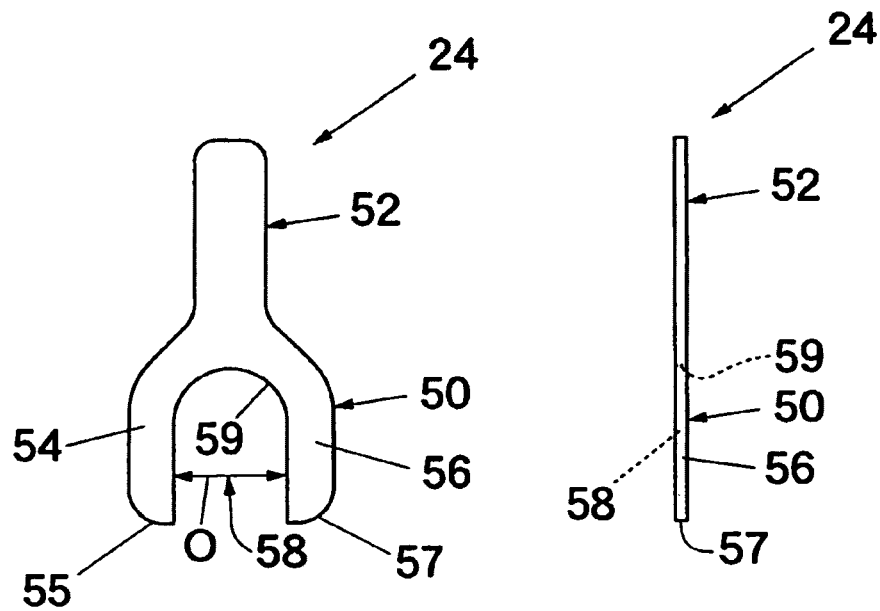
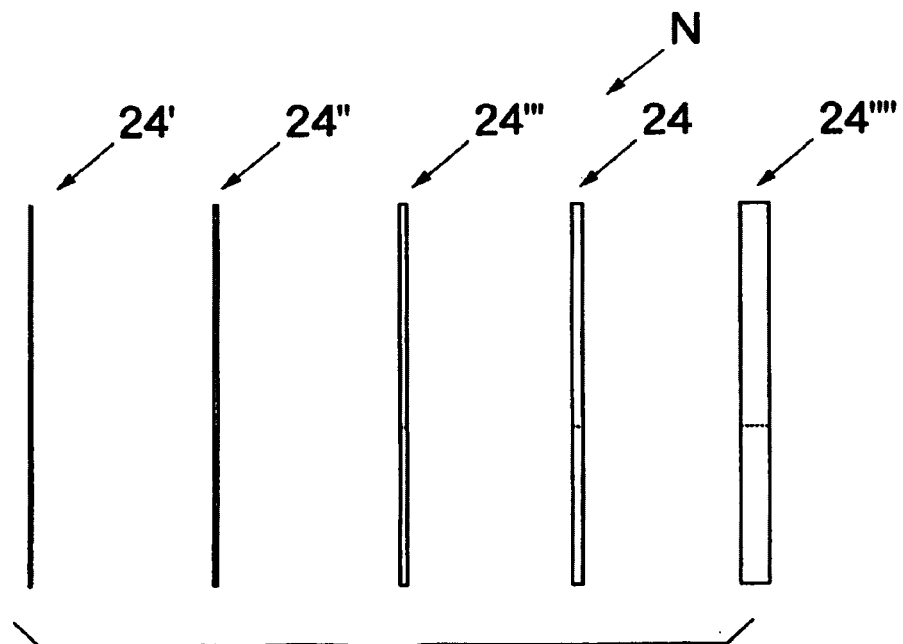

DISC BRAKE CALIPER ASSEMBLY WITH SHIMS

BACKGROUND OF THE INVENTION

1. Field of the Invention

This invention generally relates to a shim and a bicycle assembly with a shim utilized in mounting a bicycle component to the bicycle frame. More specifically, the present invention relates to a shim or set of shims utilized in mounting a disc brake caliper housing to the frame of a bicycle.

2. Background Information

Bicycling is becoming an increasingly popular form of recreation as well as a means of transportation. -Moreover, bicycling has become a very popular competitive sport. Whether the bicycle is used for recreation, transportation or competition, the bicycle industry is constantly improving their components. One particular component of the bicycle, which has been extensively redesigned over the past years, is the braking systems of bicycles. In particular, the braking power of the braking systems is constantly being increased.

There are several types of bicycle brake devices, which are currently available on the market. Examples of some types of common bicycle brake devices include rim brakes, caliper brakes and disc brakes. If a rider wants a very high performance brake system, then the rider typically wants a disc brake system. Disc brake systems provide a substantial braking power in relationship to the amount of braking force applied to the brake lever. Moreover, disc brake systems typically provide a high level of consistency in all types of weather and riding conditions. Of course, riders constantly desire disc braking systems with better performance and reliability.

Typically, the disc brake housing or caliper is mounted to part of the front and/or rear forks of the bicycle frame, while the disc brake rotor is mounted to the front and/or rear bicycle wheels. The disc brake rotor should be arranged in a rotor slot between a pair of friction pads coupled to the disc brake caliper. These typical disc brake assemblies can be difficult and/or expensive to manufacture, assemble and mount to the bicycle. Specifically, these typical disc brake assemblies often need to meet specific tolerances in order to function efficiently. Additionally, various frames sometimes have different disc brake mounting structures and different sized frame members. Moreover, certain bicycle frames are not manufactured to the tight tolerances needed for use with typical disc brake assemblies. Thus, some disc brake assemblies do not work well with certain frames. Sometimes, additional parts are needed to mount such disc brakes to certain frames, or other modifications are needed. These additional parts and/or modifications can be cumbersome and complicate installation. Moreover, these additional parts can be unattractive and decrease the efficiency of the disc brake assembly.

In view of the above, there exists a need for a shim and a bicycle assembly with a shim, which overcome the above mentioned problems in the prior art. This invention addresses this need in the prior art as well as other needs, which will become apparent to those skilled in the art from this disclosure.

SUMMARY OF THE INVENTION

One object of the present invention is to provide a shim and a bicycle assembly with a shim, which are versatile such that various combinations of components and frames can be easily used together.

Another object of the present invention is to provide a shim and a bicycle assembly with a shim, which are relatively simple and inexpensive to manufacture and assembly.

The foregoing objects can basically be achieved by providing a shim for mounting a bicycle component to a bicycle frame comprising a shim portion and a handle portion. The shim portion has a first shim section and a second shim section connected to the first shim section. The first shim section has a first free end and the second shim section has a second free end spaced from the first free end to form an open ended fastener opening between the first and second shim sections. The shim portion has a predetermined thickness in an axial direction of the fastener opening. The handle portion extends outwardly from the shim portion.

The foregoing objects can also basically be attained by providing a bicycle assembly comprising a bicycle frame portion, a bicycle component and a shim. The bicycle frame portion has a component mounting section fixedly coupled thereto. The bicycle component has a frame mounting section fixedly coupled thereto. The frame mounting section is removably coupled to the component mounting section of the frame portion by a fastener. The shim is mounted between the component mounting section and the frame mounting section on the fastener to space the bicycle component a predetermined distance from the bicycle frame portion. The shim includes a shim portion and a handle portion. The shim portion has a first shim section and a second shim section connected to the first shim section. The first shim section has a first free end and the second shim section has a second free end spaced from the first free end to form an open ended fastener opening between the first and second shim sections with the fastener selectively received therein. The shim portion has a predetermined thickness in an axial direction of the fastener opening to space the bicycle component a predetermined distance from the frame section. The handle portion extends outwardly from the shim portion.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 8 is an enlarged side elevational view of the shim of the bicycle assembly illustrated in FIGS. 1–7;

FIG. 9 is an edge elevational view of the shim illustrated in FIG. 8;

FIG. 10 is an enlarged edge elevational view of a set (plurality) of shims for the bicycle assembly illustrated in FIGS. 1–7, with each of the shims having a different thickness;

DETAILED DESCRIPTION OF THE PREFERRED EMBODIMENTS

Figure 1:
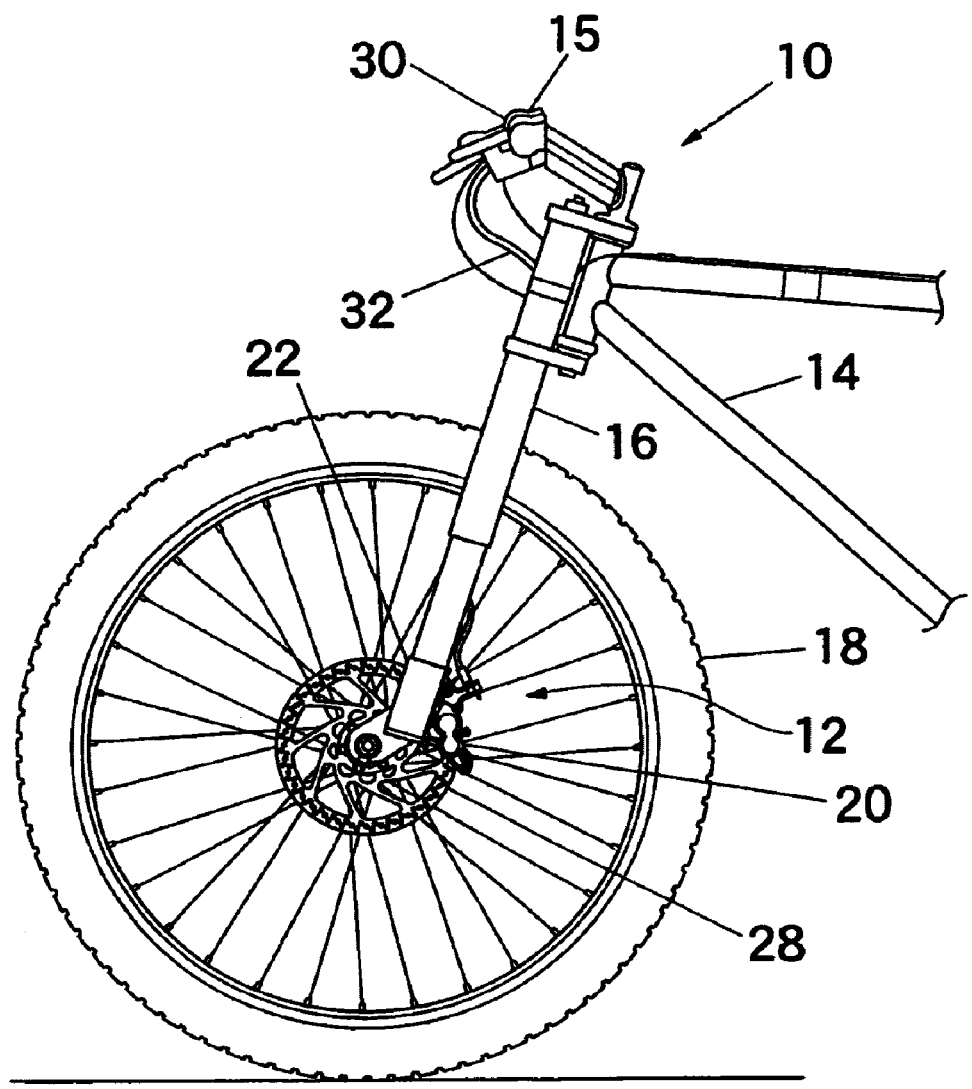
FIG. 1 is a side elevational view of a front portion of a bicycle with a bicycle assembly coupled thereto in accordance with one embodiment of the present invention.

Referring initially to FIGS. 1–4, a front portion of a bicycle 10 is illustrated with a bicycle assembly 12 coupled thereto in accordance with a preferred embodiment of the present invention. Bicycles such as bicycle 10 are well known in the art, and thus, bicycle 10 and its various components will not be discussed or illustrated in detail herein. Rather, it will be apparent to those skilled in the art that bicycle 10 can be any type of bicycle, e.g., mountain bike, a hybrid bike or a road bike. Bicycle 10 is a conventional bicycle, which basically includes a bicycle frame 14 with a handle bar 15, front and rear forks 16 (only front fork shown), front and rear wheels 18 (only front wheel shown) and a drive train (not shown).

Figure 5:
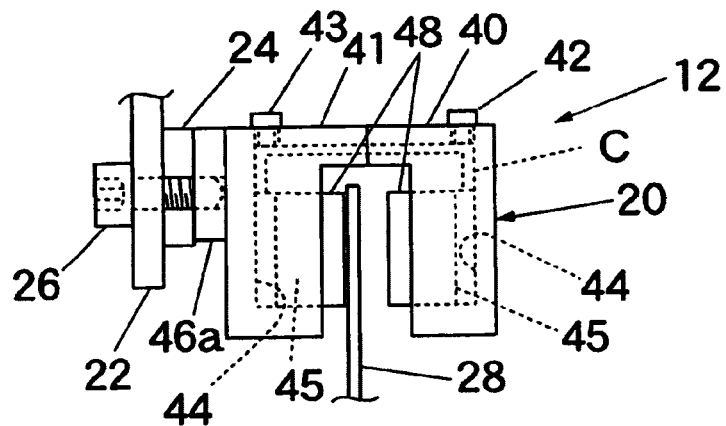
FIG. 5 is a diagrammatic view of the bicycle assembly illustrated in FIGS. 1–4, showing a situation when the shim is thicker than desired.
Figure 6:
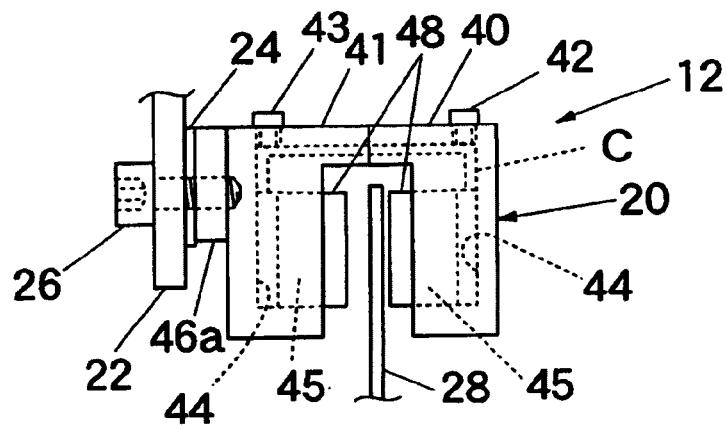
FIG. 6 is a diagrammatic view of the bicycle assembly illustrated in FIGS. 1–4, showing a situation when the shim is thinner than desired.
Figure 7:
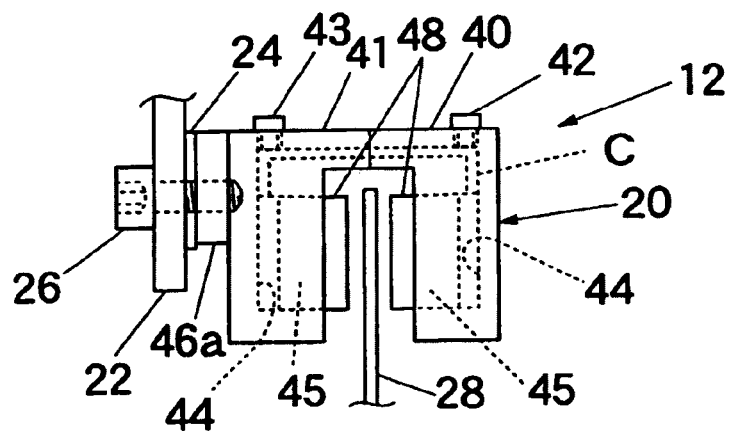
FIG. 7 is a diagrammatic view of the bicycle assembly illustrated in FIGS. 1–4, showing a situation when the shim is the desired thickness.

In the illustrated embodiment, the bicycle assembly 12 basically includes a bicycle disc brake caliper housing 20 (bicycle component), a frame portion 22 and a shim 24. The shim 24 is designed to be mounted between the disc brake caliper housing 20 and the frame portion 22. It is important that the disc brake caliper housing 20 has a particular alignment so that the disc brake rotor 28 can freely rotate between the brake pads of the disc brake caliper housing 20. The shim(s) 24 of the present invention allows for easy mounting of a bicycle disc brake caliper housing 20 to the frame portion 22 (as seen in FIGS. 5–7). Specifically, the shim or shims 24 can be easily removed and/or inserted between the bicycle disc brake caliper housing 20 and the frame portion 22 even when the bicycle disc brake caliper housing 20 and the frame portion 22 are coupled together by fastener(s) or threaded bolts 26.

In the illustrated embodiment, the frame portion 22 is integrally formed with the front fork 16 and includes a pair of mounting flanges 23a and 23b. Each mounting flange 23a and 23b has an unthreaded through bore for receiving one of the fasteners 26. The mounting flanges 23a and 23b form a component mounting section of the frame portion 22. Of course, it will be apparent to those skilled in the art from this disclosure that the frame portion 22 could be a separate member from the front fork 16 and could be releasably coupled to the front fork 16, if needed and/or desired.

Moreover, it will be apparent to those skilled in the art that the frame mounting section could have various other configurations as needed and/or desired. However, the frame mounting section is preferably configured such that shim(s) 24 can be mounted between the component mounting section and a bicycle component.

In the illustrated embodiment, the shim(s) 24 is utilized with a bicycle disc brake caliper housing 20 that is part of a disc brake assembly. Of course, it will be apparent to those skilled in the art that the shim(s) 24 can be used with any other bicycle component or bicycle structure that needs shimming. For example, the shim(s) 24 could be used to shim a rear derailleur or a front derailleur. In any event, the shim 24 is particularly useful with a disc brake assembly since it is desirable that the disc brake rotor 28 have a particular alignment between the friction pads 48 of the disc brake caliper housing 20. Thus, the friction pads 48 will not rub on the disc brake rotor 28 during normal riding or wear unequally. Rather, the friction pads 48 will remain spaced from the disc brake rotor 28 such that a reliable braking force can easily be applied by the rider.

A single shim 24 is illustrated as being utilized with each fastener 26 (with each attachment portion of the bicycle disc brake caliper housing 20). However, it will be apparent to those skilled in the art that more than one shim 24 can be used with each fastener 26. For example, if a large gap exists between the bicycle disc brake caliper housing 20 and the mounting flanges 23a and 23b of the frame portion 22, a plurality of shims 24 could be utilized with each fastener 26. Moreover, if only one of the attachment portions of the bicycle disc brake caliper housing 20 needs a plurality of shims 24, it is possible that an unequal number of shims 24 could be used with each fastener 26. The structure of the shim(s) 24 will be discussed in more detail below.

While only the front portion of bicycle 10 is illustrated as having a bicycle assembly 12 (with a front disc brake caliper), it will be apparent to those skilled in the art from this disclosure that a second or rear bicycle assembly 12 (with a rear disc brake caliper) can be shimmed using the shim 24 of the present invention. Moreover, while the illustrated bicycle assembly 12 includes the disc brake caliper housing 20 as the bicycle component that is being shimmed, it will be apparent to those skilled in the art from this disclosure that various other components could be used in conjunction with the present invention. It will also be apparent to those skilled in the art from this disclosure that various changes and modifications can be made from the embodiments disclosed herein without departing from the scope of the invention as defined in the appended claims.

As mentioned above, the bicycle disc brake caliper housing 20 is mounted on the front fork 16 of the bicycle 10 via the fasteners 26. The disc brake rotor 28 is arranged between a pair of friction pads of the disc brake caliper housing 20. The disc brake rotor 28 is fixedly coupled to the front wheel 18 for rotation therewith in a conventional manner. A brake operating mechanism 30 is preferably fixedly mounted on the handle bar 15 adjacent the hand portion of the handle bar 15. The brake operating mechanism 30 is operatively coupled to the disc brake caliper housing 20 by a brake fluid hose 32. Accordingly, the brake operating mechanism 30 is operated to move the friction pads of the disc brake caliper housing 20 between a release position and a braking position. In particular, when in a release position, the bicycle wheel 18 and disc brake rotor 28 are free to rotate. When in a braking position, the friction pads 48 of the disc brake caliper housing 20 apply a braking force against the disc brake rotor 28 to stop rotation of the front bicycle wheel 18 and the disc brake rotor 28.

Figure 2:
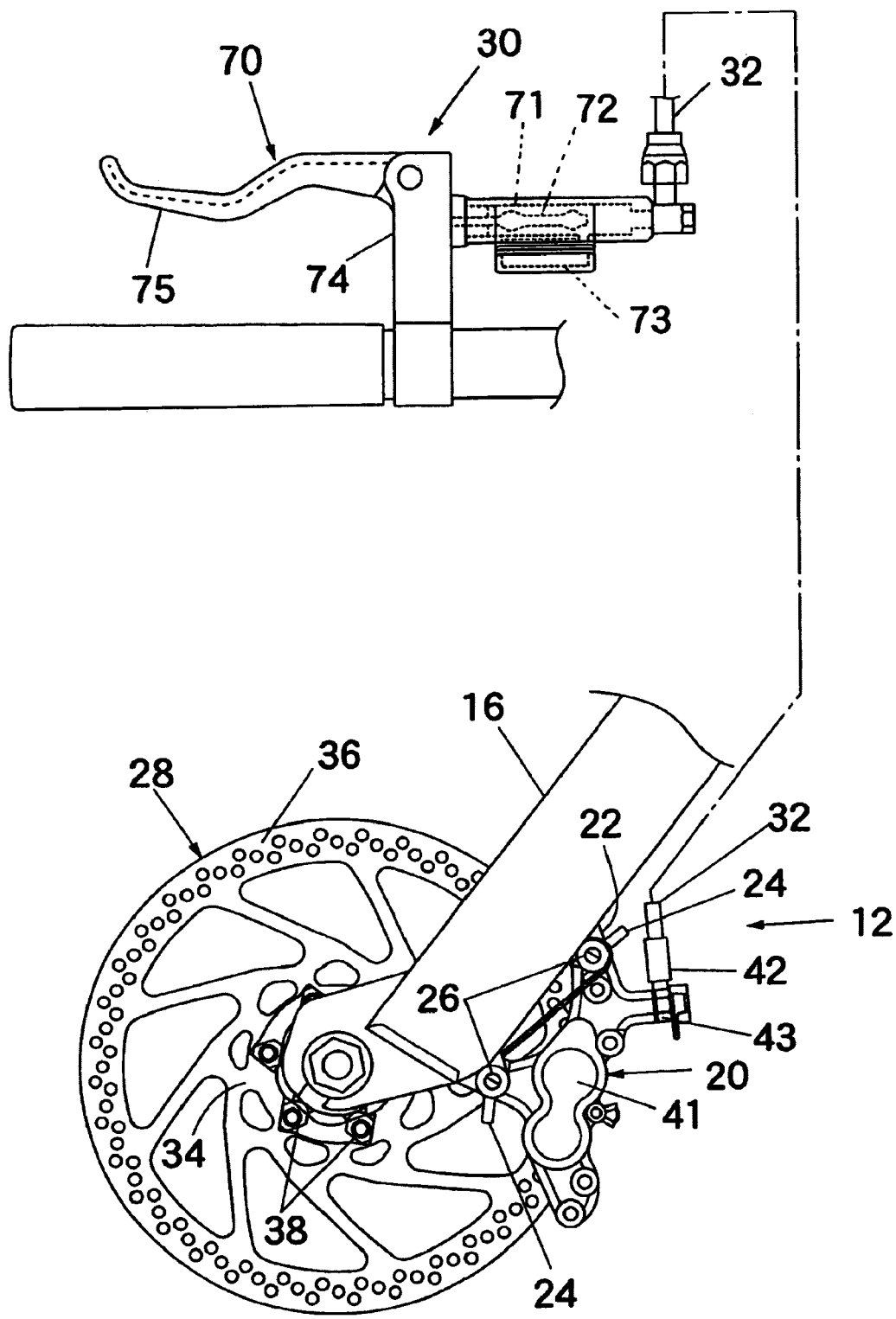
FIG. 2 is a side elevational view of the bicycle assembly coupled to a front fork and a front disc brake operating mechanism of the bicycle illustrated in FIG. 1.
Figure 3:
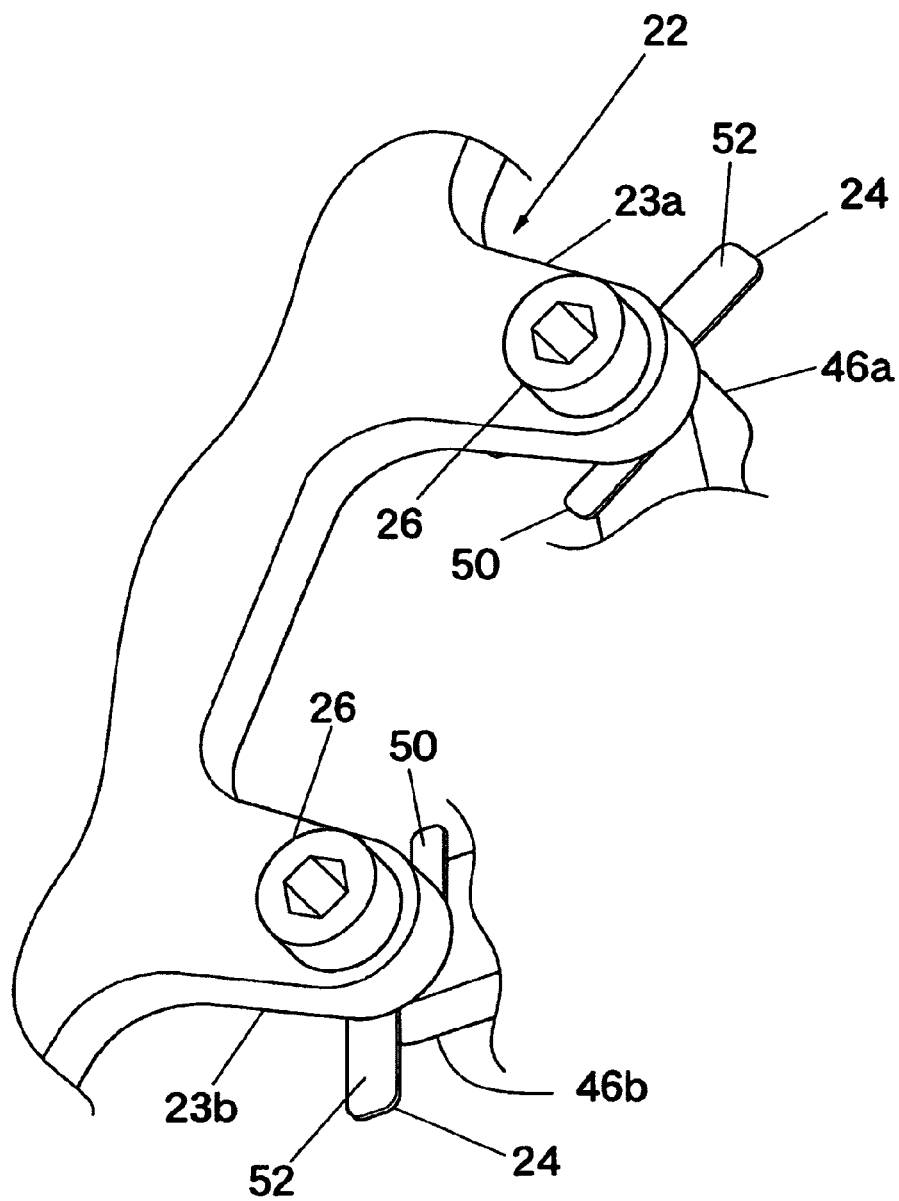
FIG. 3 is an enlarged, partial side perspective view of the bicycle assembly illustrated in FIGS. 1 and 2, with the parts coupled together.

As seen in FIGS. 1 and 2, the disc brake rotor 28 is conventional and basically includes a mounting portion 34 and a disc brake portion 36 extending from the mounting portion 34. Preferably, the disc brake rotor 28 is constructed as a one-piece, unitary member from a rigid material, such as steel, titanium or aluminum. The mounting portion 34 preferably has six attachment holes that receive bolts 38 for securing the disc brake rotor 28 to the hub of the wheel 18. Alternatively, the mounting portion 34 can be provided with splines for being fixedly coupled to the hub of the bicycle wheel 18. In any event, the disc brake rotor 28 is mounted to rotate with the wheel 18.

As best seen in FIGS. 2 and 4–7, the disc brake caliper housing 20 (bicycle component) is a conventional disk brake caliper housing that is part of a conventional disc brake assembly. The disk brake caliper housing 20 is preferably formed of rigid metallic material such as cast aluminum. The caliper housing 20 basically includes a first caliper housing portion 40 and a second caliper housing portion 41. First and second caliper housing portions 40 and 41 are fixedly coupled together by a plurality of bolts. First caliper housing portion 40 has a first threaded hole for receiving a fluid coupling unit 42 (connected to fluid supply hose 32). Second caliper housing portion 41 includes a second threaded hole for receiving a bleed valve 43. The caliper housing preferably includes four ports or piston receiving openings 44 (only two shown). While a hydraulic type disc brake caliper with four pistons is illustrated, it will be apparent to those skilled in the art from this disclosure that the shims 24 can be used with any type of disc brake caliper, such as a mechanical disc brake caliper with a single piston.

In the illustrated embodiment, each of the first and second caliper housing portions 40 and 41 preferably has a pair of piston receiving openings 44 formed therein for receiving a pair of pistons 45. Each pair of piston receiving openings 44 formed in one of caliper housing portions 40 or 41 is arranged to oppose the pair of piston receiving openings 44 formed in the other one of caliper housing portions 40 or 41. Each pair of pistons 45 (i.e. mounted in one of the caliper housing portions 40 or 41) is arranged to move one of the friction members 48 toward disc brake rotor 28 in a conventional manner.

The piston receiving openings 44 are in fluid communication with the fluid coupling unit 42 and the bleed valve 43 via a network of fluid conduits C in a conventional manner. Thus, when actuating fluid is supplied to the disc brake caliper housing 20 through fluid coupling unit 42, the actuating fluid flows through the network of conduits into the piston receiving openings 44. Each piston receiving opening 44 is preferably an annular opening sized and configured to receive one of the pistons 45 therein. Moreover, each piston receiving opening 44 preferably has a circumferential groove for receiving a return sealing ring or spring back seal (not shown). Thus, the pistons 45 can be returned to their release position when fluid pressure is released in a conventional manner. The disc brake caliper housing 20 preferably includes a pair of mounting flanges 46a and 46b configured to mount the disc brake caliper housing 20 to the front fork 16. Each of the mounting flanges 46a and 46b preferably includes a threaded through hole formed therein designed to threadedly receive one of the fasteners 26. The mounting flanges 46a and 46b are designed so the threaded through holes are axially aligned with the unthreaded through holes of the mounting flanges 23a and 23b of the frame portion 22. The mounting flanges 46a and 46b form a frame mounting section of the bicycle disc brake caliper 20 (bicycle component). As mentioned above, the disc brake housing 20 is conventional. Accordingly, the disc brake caliper housing 20 will not be discussed or illustrated in further detail herein. Rather, it will be apparent to those skilled in the art that various or modifications can be made to the disc brake caliper housing 20 without departing from the scope of the present invention.

As best seen in FIGS. 8–10, each of the shims 24 basically includes a shim portion 50 and a handle portion 52 extending outwardly from the shim portion 50. The shim 24 is preferably a one-piece unitary member constructed of thin, rigid metallic material such as thin sheet metal material. Of course, the shim 24 could be constructed from any suitable material or utilizing any suitable manufacturing techniques if needed and/or desired. The shim 24 preferably has a substantially constant predetermined thickness in the range of about 0.1 millimeters and about 2.0 millimeters. More specifically, the shim 24 preferably has a uniform thickness of either 0.1, 0.2, 0.5, 1.0 or 2.0 millimeters and is part of a shim set N. In FIGS. 8–10, the shim 24 has a thickness (relative to the other shims) of about 1.0 millimeter. Of course, this thickness is utilized merely as an example of one desired shim thickness. The shim set N preferably includes at least a plurality of shims 24', 24'', 24''', 24 and 24'''' having uniform thicknesses of 0.1, 0.2, 0.5, 1.0 and 2.0 millimeters, respectively, as seen in FIG. 10. Preferably, at least one shim set N is provided for each fastener 26. Moreover, an additional shim 24' is also preferably provided for each fastener 26. Thus, various combinations of shims can be utilized to create the desired shim thickness in 0.1 millimeter increments for each fastener 26.

Of course, it will be apparent to those skilled in the art that only the thickness of the shim portion 50 is critical to the shimming process. Thus, only the shim portion 50 needs to be a predetermined, uniform thickness. In other words, the handle portion 52 can have a different non-uniform thickness, since it is utilized in mounting the shims 24 on the fasteners 26. Specifically, the handle portion 52 is utilized to position the shim 24 between the disc brake caliper housing 20 and the frame portion 22 (on the fastener 26). Preferably, the handle portion 52 can be bent (i.e. around part of the disc brake caliper housing 20 and the frame portion 22) once the shim portion 50 is in the desired position. Accordingly, it will be apparent to those skilled in the art from this disclosure that the handle portion 52 could be thinner or thicker than the shim portion 50 if needed and/or desired. For example, if a shim 24 has a thickness of about 2.0 millimeters, it could be slightly difficult to bend the handle portion 52 to secure the shim 24 to the bicycle assembly 12 prior to tightening the fasteners 26. Accordingly, the handle portion 52 could be thinner than the shim 24 portion 50 if needed and/or desired. In any event, the handle portion 52 is preferably the same thickness as the shim portion 50 because such the shim 24 can be easily manufactured.

The shim portion 50 basically includes a first shim section 54 and a second shim portion 56 connected to the first shim section 54. The first and second shim section 54 and 56 have first and second free ends 55 and 57, respectively. The (first) free end 55 is spaced from the (second) free end 57 to form an open-ended fastener opening 58 between the first and second shim sections 54 and 56. The thickness of the shim 24 is measured in an axial direction of the open ended fastener opening 58. In other words, when shim 24 is mounted on one of the fasteners 26 between the frame portion 22 and the disc brake caliper housing 20, the thickness of the shim 24 is measured along the longitudinal axis of the fastener 26.

Figure 4:
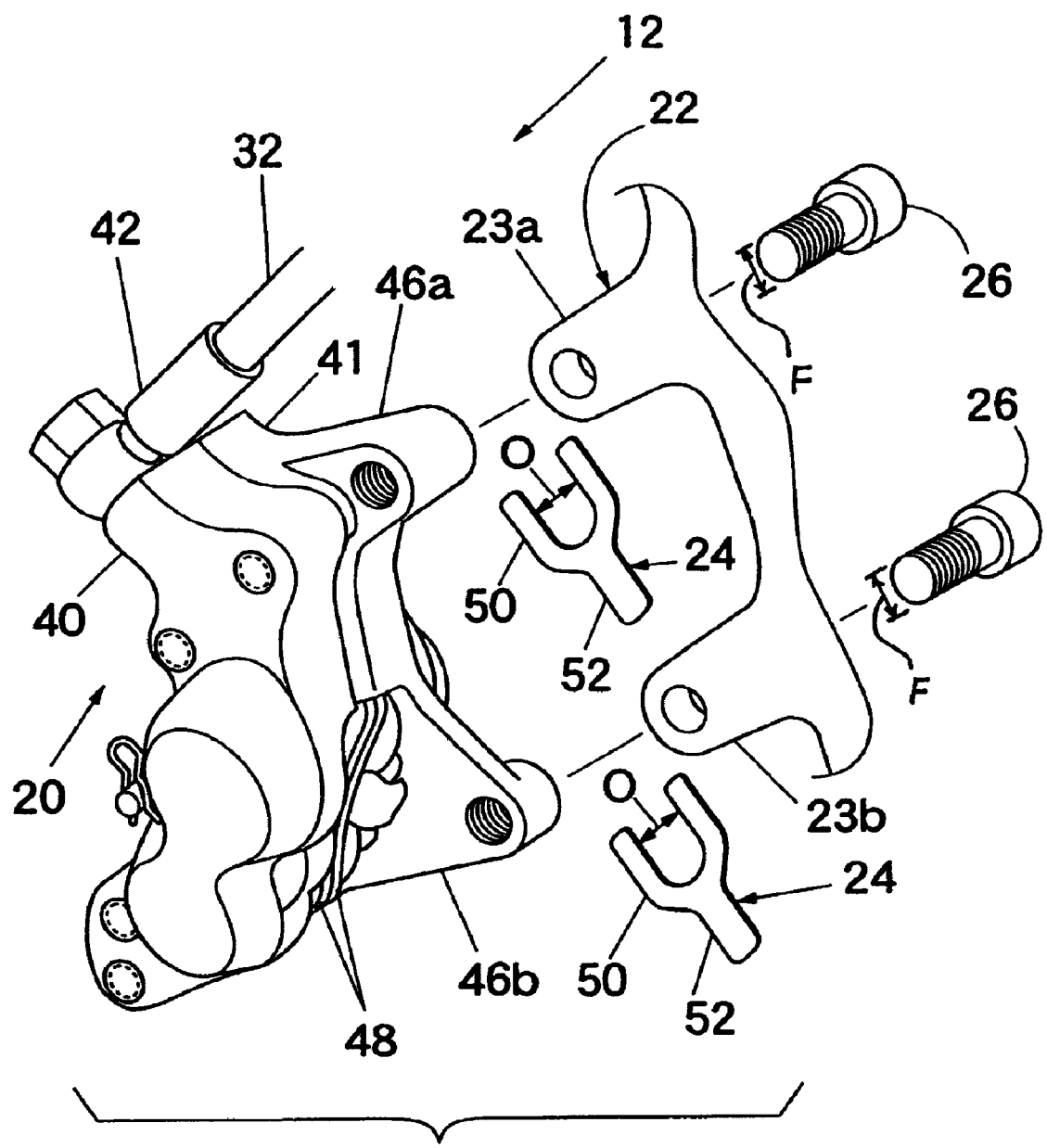
FIG. 4 is an enlarged, exploded, reverse perspective view of the bicycle assembly illustrated in FIGS. 1–3.

The first and second shim sections 54 and 56 are preferably configured to form a substantially U-shaped surface 59, which defines the fastener opening 58. Moreover, in the illustrated embodiment, the shim portion 50 preferably has a substantially U-shaped configuration. Of course, it will be apparent to those skilled in the art from this disclosure that the shim portion could have various other configurations as needed and/or desired. For example, the shim portion 50 could have a C-shaped configuration as discussed below in reference to another preferred embodiment of the present invention. In any event, the shim portion 50 is designed and configured to be removable from the fastener 26 without removing the fastener 26 from the bicycle assembly 12. In other words, the fastener opening 58 has a transverse dimension O that is equal to or slightly larger than the transverse dimension F of the shaft of the fastener 26, as best seen in FIG. 4.

The handle portion 52 is preferably a tab, which extends in a direction substantially opposite from the open-ended fastener opening 58. In other words, in the illustrated embodiment, the handle portion 52 is preferably substantially parallel to the first and second shim sections 54 and 56 and extends in an opposite direction therefrom. Of course, it will be apparent to those skilled in the art from this disclosure that the handle portion 52 could have various other configurations as needed and/or desired. For example, the handle portion 52 could include a frangible section or reduced cross-section area as discussed below in reference to another preferred embodiment of the present invention.

Moreover, as mentioned above, the handle portion 52 could have a different thickness from the shim portion 50 if needed and/or desired. In the illustrated embodiment, the handle portion 52 has a substantially constant cross-section, and does not include any type of indicator or identifying portion to indicate the thickness of the shim portion 50. However, it will be apparent to those skilled in the art from this disclosure that the handle portion 52 can include indicia that acts an indicator to identify the thickness of the shim portion 50, as discussed below in reference to another preferred embodiment of the present invention.

Finally, while in this embodiment of the present invention the handle portion 52 extends in a direction opposite the open-ended fastener opening 58, it will be apparent to those skilled in the art from the disclosure that various other locations for the handle portion 52 could be utilized without departing from the scope of the present invention. For example, the handle portion 52 could be formed of multiple handle sections extending from each shim section 54 and 56.

Referring again to FIGS. 1 and 2, the brake operating mechanism 30 preferably is a conventional single unit, which is mounted on the handlebar 15. The brake operating mechanism 30 is designed to actuate the disc brake caliper by supplying actuating fluid to the disc brake caliper via the hose 32 and the fluid coupling unit 43 to apply a forcible gripping action on the disc brake rotor 28. The brake operating mechanism 30 basically includes a brake lever 70, a hydraulic or master cylinder 71, a hydraulic or master piston 72, and an actuation fluid reservoir 73. In particular, the brake lever 70 includes a mounting portion 74 and a lever portion 75. The mounting portion 74 is designed to be clamped onto the handle bar 15 in a conventional manner. The mounting portion 74 is integrally formed with the master cylinder 71 such that the master cylinder 71, the master piston 72 and the actuation fluid reservoir 73 are all supported on the mounting portion 74 of the brake lever 70. The lever portion 75 is pivotally coupled to the mounting portion 74 for movement between a release position and a braking position. Normally, the lever portion 75 is maintained in a release position in a conventional manner, e.g. by a return spring (not shown).

The master piston 72 is movably mounted within the master cylinder 71 in a conventional manner. More specifically, the actuation fluid reservoir 73 is mounted on the master cylinder 71 and in fluid communication with the interior bore of the master cylinder 71 for supplying actuation fluid thereto. The master piston 72 is connected at one end to the lever portion 75 for axially moving the master piston 72 within the master cylinder 71. Accordingly, actuation of the lever portion 75 causes the master piston 72 to move axially within the master cylinder 71. This movement of the master piston 72 within the master cylinder 71 directs fluid pressure through a hydraulic line or brake fluid hose 32, which is coupled to the disc brake caliper housing. Thus, the pressurized actuation fluid causes the pistons 45 and the friction members 48 to engage disc brake rotor 28 to stop rotation of wheel 18.

Second Embodiment

Figure 11:
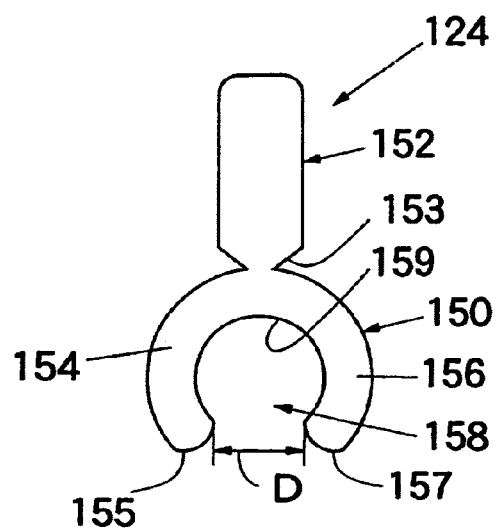
FIG. 11 is an enlarged side elevational view of a shim in accordance with a second preferred embodiment of the present invention.
Figure 12:
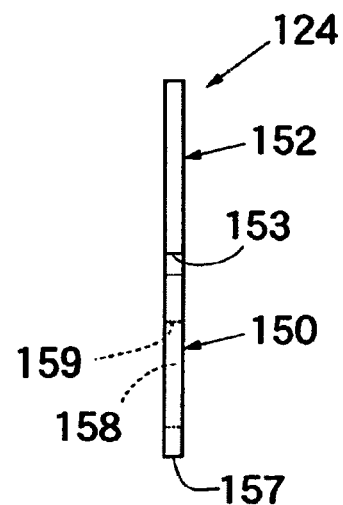
FIG. 12 is an edge elevational view of the shim illustrated in FIG. 11.

Referring to FIGS. 11 and 12, a modified shim 124 in accordance with the second embodiment of the present invention will now be discussed. The shim 124 is substantially identical to the shim 24 of the first embodiment. Specifically, the shim 124 is identical to the shim 24 of the first embodiment, except that the shim 124 includes a shim portion 150 with a modified shape and a handle portion 152 with a frangible section. The shim 124 is designed to be used with the disc brake caliper housing 20, the frame portion 22 and the fasteners 26 of the first embodiment (i.e. in the bicycle assembly illustrated in FIGS. 1–7) in a manner substantially identical to the shim 24 of the first embodiment. In view of the similarities between this second embodiment and the first embodiment, this second embodiment will not be discussed or illustrated in detail herein. Rather, the following description will focus mainly on the differences. Moreover, the explanations of components or parts and the operations of this second embodiment that are similar to components or parts and the operations of the first embodiment will be omitted.

As mentioned above, the shim 124 basically includes a shim portion 150 and a handle portion 152 extending outwardly from the shim portion 150. The shim 124 is preferably a one-piece unitary member constructed of thin sheet metal material. Additionally, the shim 124 preferably has a substantially constant predetermined thickness of between about 0.1 millimeters and about 2.0 millimeters. More specifically, the shim 124 preferably has a uniform thickness of either 0.1, 0.2, 0.5, 1.0 or 2.0 millimeters and is part of a set of shims (not shown in FIGS. 11 and 12) similar to the first embodiment (FIG. 10).

The shim portion 150 basically includes a first shim section 154 and a second shim portion 156 connected to the first shim section 154. The first and second shim section 154 and 156 have first and second free ends 155 and 157, respectively. The (first) free end 155 is spaced from the (second) free end 157 to form an open-ended fastener opening 158 between the first and second shim sections 154 and 156. The thickness of the shim 124 is measured in an axial direction of the open ended fastener opening 158. In other words, when shim 124 is mounted on one of the fasteners 26 between the frame portion 22 and the disc brake caliper housing 20, the thickness of the shim 124 is measured along the longitudinal axis of the fastener 26.

The first and second shim sections 154 and 156 are preferably configured to form a substantially C-shaped surface 159, which defines the fastener opening 158. Moreover, in the illustrated embodiment, the shim portion 150 preferably has a substantially C-shaped configuration. The shim portion 150 is designed and configured to be removable from the fastener 26 without removing the fastener 26 from the bicycle assembly 12. Moreover, the shim portion 150 is configured such that the shim 124 will not fall off of the fastener 26. Specifically, the fastener opening 158 preferably has a transverse dimension D slightly smaller than the transverse dimension F of the shaft of the fastener 26 (seen in FIG. 4). Thus, the shim sections 154 and 156 are preferably elastically deformed when the shim 124 is mounted on one of the fasteners 26, and thus retained on the fastener 26.

The handle portion 152 is preferably a tab, which extends in a direction substantially opposite from the open-ended fastener opening 158. In other words, in the illustrated embodiment, the handle portion 152 preferably extends in a substantially opposite direction from the shim sections 154 and 156. The handle portion 152 preferably includes a frangible section 153 or reduced cross-section area adjacent the shim portion 150 such that the handle portion 152 can be removed or broken-off from the shim portion 150 after tightening the fasteners 26. In the illustrated embodiment, the frangible section 153 is formed by a pair of notches or cutouts formed in the handle portion 152. Thus, applying a bending force to the handle portion 152 relative to the shim portion 150 will cause the handle portion 150 to break at the frangible section 153. Of course, it will be apparent to those skilled in the art from this disclosure that the frangible section can be formed in other ways, such as using perforations or reducing the thickness of the shim 124 along a transverse line between the handle portion 152 and the shim portion 150.

Third Embodiment

Figure 13:
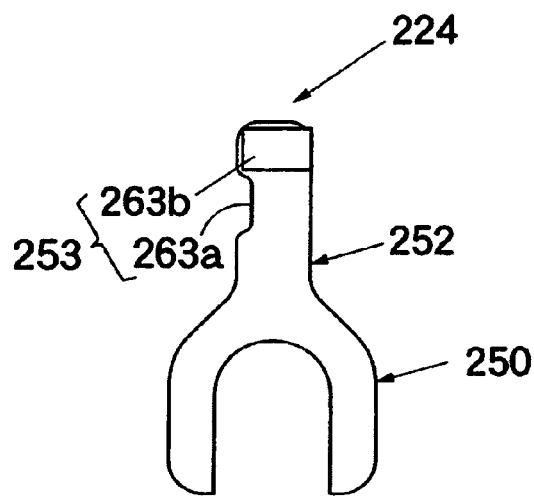
FIG. 13 is an enlarged side elevational view of the shim in accordance with a third preferred embodiment of the present invention.
Figure 14:
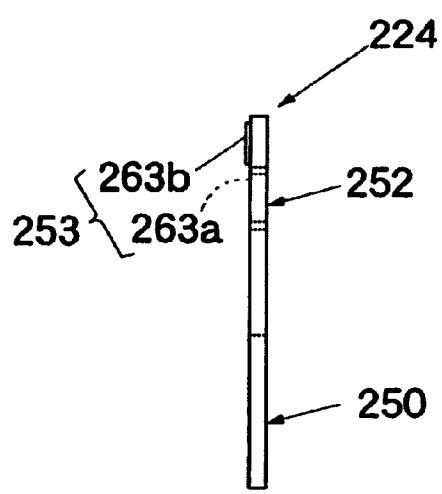
FIG. 14 is an edge elevational view of the shim illustrated in FIG. 13.

Referring to FIGS. 13 and 14, a modified shim 224 in accordance with the third embodiment of the present invention will now be discussed. The shim 224 is substantially identical to the shim 24 of the first embodiment. Specifically, the shim 224 is identical to the shim 24 of the first embodiment except that the shim 124 includes a handle portion 252 includes indicia that acts as an indicator to identify the predetermined thickness of the shim 224. The shim 224 is designed to be used with the disc brake caliper housing 20, the frame portion 22 and the fasteners 26 of the first embodiment (i.e. in the bicycle assembly illustrated in FIGS. 1–7) in a manner identical to the shim 24 of the first embodiment. In view of the similarities between this third embodiment and the first embodiment, this third embodiment will not be discussed or illustrated in detail herein. Rather, the following description will focus mainly on the differences. Moreover, the explanations of components or parts and the operations of this third embodiment that are similar to components or parts and the operations of the first embodiment will be omitted.

The shim 224 basically includes a shim portion 250 and a handle portion 252 extending outwardly from the shim portion 250. The shim 224 is preferably a one-piece unitary member constructed of thin sheet metal material. Additionally, the shim 224 preferably has a substantially constant predetermined thickness of between about 0.1 millimeters and about 2.0 millimeters. More specifically, the shim 224 preferably has a uniform thickness of either 0.1, 0.2, 0.5, 1.0 or 2.0 millimeters and is part of a set of shims (not shown in FIGS. 13 and 14) similar to the first embodiment (FIG. 10).

The shim portion 250 is identical to the shim portion 50 of the first embodiment. Accordingly, the shim portion 250 will not be discussed and/or illustrated in further detail herein. The handle portion 252 is identical to the handle portion 52 of the first embodiment except that handle portion 252 includes an indicator 253 or indicia to identify the predetermined thickness of the shim portion 250. Thus, the handle portion 252 is preferably a tab, which extends in a direction substantially opposite from the open-ended fastener opening of the shim 224.

The indicator 253 preferably includes an identification recess 263a formed in the handle portion 252, and a colored material 263b coupled to the handle portion 252. In other words, shims having different sizes will have different shapes of identification recesses 263a and different colors of the colored material. For example, the colors red, blue, green, yellow and orange can be used to indicate a shim thickness of 0.1, 0.2, 0.5, 1.0 and 2.0 millimeters, respectively. Thus, a visual (by looking at the color of the material 263b) indicator and a mechanical (by touching the identification recess 263a) indicator is provided to indicate the thickness of the shim portion 250. Of course, the handle portion 252 could include only one of identification recess 263a or the colored material 263b if needed and/or desired. Moreover, any other suitable indicia could also be utilized if needed and/or desired. For example, the thickness of the shim portion 250 can be stamped or embossed on the handle portion 252.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A bicycle disc brake assembly comprising:
   a bicycle frame portion having mounting flanges fixedly coupled thereto;
   a bicycle disc brake caliper having a housing with frame mounting sections fixedly coupled thereto, said housing being configured to form a disc brake rotor slot, said frame mounting sections being removably coupled to said mounting flanges of said frame portion by fasteners; and
   at least one metal shim mounted between one of said mounting flanges and a corresponding one of said frame mounting sections on a corresponding one of said fasteners to selectively space said disc brake rotor slot of said bicycle disc brake caliper a predetermined distance from said bicycle frame portion, said at least one shim including a shim portion and a handle portion extending outwardly from said shim portion, said shim portion having a first shim section with a first curved edge surface and a second shim section with a second curved edge surface, said first and second curved edge surfaces being concaved in opposite directions relative to each other to form a substantially C-shaped edge surface defining a fastener opening with a predetermined maximum width between said first and second curved edge surfaces and with one of said fasteners selectively received therein, said first curved edge surface of said first shim section having a first free end and said second curved edge surface of said second shim section having a second free end spaced from said first free end to form an open end of said fastener opening between said first and second shim sections with said open end of said fastener opening having a predetermined minimum width that is smaller than said predetermined maximum width, said fastener including a head and a shaft that has a transverse dimension smaller than a transverse width of the head and larger than said predetermined minimum width between said first and second free ends of said shim portion, said shim portion having a predetermined thickness in an axial direction of said fastener opening to space said disc brake rotor slot of said bicycle disc brake caliper said predetermined distance from said bicycle frame portion, each of said shim sections having a maximum transverse width that is smaller than said maximum predetermined width of said fastener opening as measured in a direction parallel to said predetermined minimum width of said open end of said fastener opening.

2. The bicycle disc brake assembly according to claim 1, wherein
said handle portion is a tab extending in a substantially opposite direction from said open end of said fastener opening.

3. The bicycle disc brake assembly according to claim 1, wherein
said handle portion includes a frangible section that is adjacent to said shim portion.

4. The bicycle disc brake assembly according to claim 1, wherein
said handle portion includes an indicator to identify said predetermined thickness of said shim portion.

5. The bicycle disc brake assembly according to claim 1, wherein
said handle portion includes an identification recess formed in said handle portion to identify said predetermined thickness of said shim portion.

6. The bicycle disc brake assembly according to claim 4, wherein
said indicator includes a colored material coupled to said handle portion.

7. A method of mounting a disc brake caliper to a bicycle frame comprising the steps of:
partially attaching a caliper housing of the disc brake caliper having a disc brake rotor slot to a first mounting flange of the bicycle frame by a first fastener;
selecting at least one first metal shim of a plurality of metal shims with predetermined thicknesses, each of the plurality of shims including a handle portion and a shim portion with first and second shim sections that form an fastener opening, said first and second shim sections having first and second curved edge surfaces, respectively, said first and second curved edge surfaces being concaved in opposite directions relative to each other to form a substantially C-shaped edge surface defining said fastener opening with a predetermined maximum width between said first and second curved edge surfaces, said first curved edge surface of said first shim section having a first free end and said second curved edge surface of said second shim section having a second free end spaced from said first free end to form an open end of said fastener opening between said first and second shim sections with said open end of said fastener opening having a predetermined minimum width that is smaller than said predetermined maximum width, each of said shim sections having a maximum transverse width that is smaller than said maximum predetermined width of said fastener opening as measured in a direction parallel to said predetermined minimum width of said open end of said fastener opening, the first fastener including a head and a shaft that has a transverse dimension smaller than a transverse width of the head and larger than said predetermined minimum width between first and second free ends of the first and second shim sections of the plurality of shims, respectively;

inserting the at least one first shim between the caliper housing and the first mounting flange after the caliper housing has been partially attached to the first mounting flange such that the first fastener is located in the fastener opening of the at least one first shim and the disc brake rotor slot of the disc brake caliper is spaced from the bicycle frame by a predetermined distance to orient the disc brake rotor slot relative to the bicycle frame; and tightening the first fastener to fixedly secure the disc brake caliper to the bicycle frame.

8. The method according to claim 7, further comprising the steps of
partially attaching the caliper housing of the disc brake caliper to a second mounting flange of the bicycle frame by a second fastener;
selecting at least one second shim of the plurality of shims to be inserted between the caliper housing and the second mounting flange;
inserting the at least one second shim between the caliper housing and the second mounting flange after the caliper housing has been partially attached to the second mounting flange such that the second fastener is located in the open end of said fastener opening of the at least one second shim and the disc brake rotor slot of the disc brake caliper is spaced from the bicycle frame by the predetermined distance to orient the disc brake rotor slot relative to the bicycle frame; and
tightening the second fastener to fixedly secure the disc brake caliper to the bicycle frame.

9. The method according to claim 7, further comprising
selecting an additional shim of the plurality of shims to be inserted between the caliper housing and the first mounting flange; and
inserting the additional shim between the caliper housing and the first mounting flange after the caliper housing has been partially attached to the first mounting flange and prior to the tightening of the first fastener such that the first fastener is located in the open end of said fastener opening of the additional shim.

10. The method according to claim 8, further comprising
selecting at least one third shim of the plurality of shims to be inserted between the caliper housing and the first mounting flange; and inserting the at least one third shim between the caliper housing and the first mounting flange after the caliper housing has been partially attached to the first mounting flange and prior to the tightening of the first fastener such that the first fastener is located in the open end of said fastener opening of the at least one third shim.

11. The method according to claim 7, wherein each of the handle portions of the plurality of shims is a tab extending in a substantially opposite direction from the open end of said fastener opening.

12. The method according to claim 7, further comprising the step of detaching the handle portion of the at least one first shim by breaking off the handle portion at a frangible section after the tightening of the first fastener.

13. The method according to claim 7, wherein each of the handle portions of the plurality of shims includes an indicator to identify the predetermined thickness of the shim.

14. The method according to claim 7, wherein each of the handle portions of the plurality of shims includes an identification recess to identify the predetermined thickness of the shim.

15. The method according to claim 13, wherein each of the indicators of the plurality of shims includes a colored material coupled to the handle portion.

* * * * *